April 27, 1943.  L. L. HAMILTON  2,317,604
POWER ACTUATOR AND CONTROL FOR HYDRAULIC BRAKE
Filed May 26, 1941
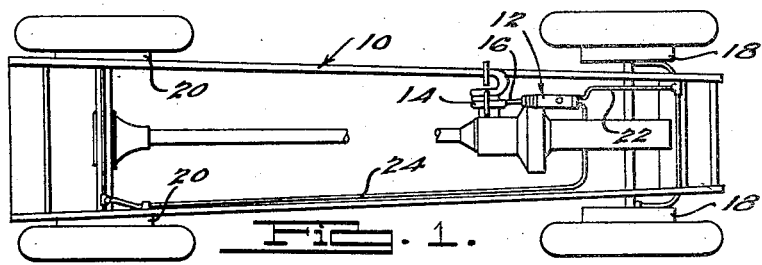
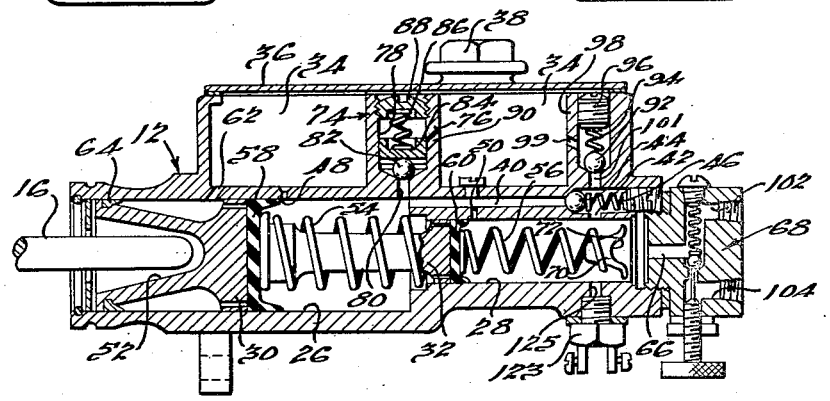
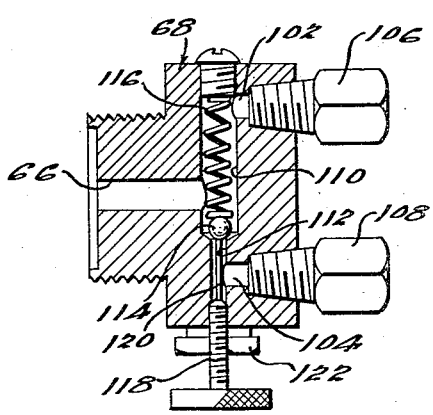
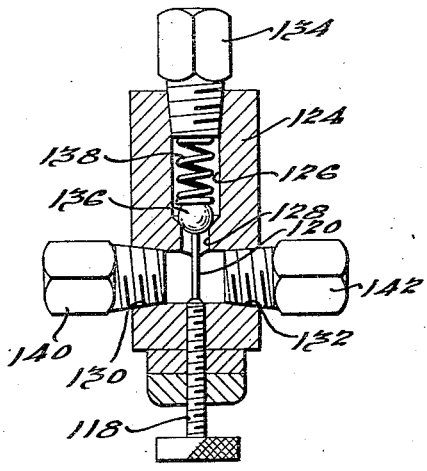
INVENTOR
Lloyd L. Hamilton.
BY
Harness, Dickey & Pierce
ATTORNEYS.

Patented Apr. 27, 1943

2,317,604

UNITED STATES PATENT OFFICE 2,317,604

POWER ACTUATOR AND CONTROL FOR HYDRAULIC BRAKES

Lloyd L. Hamilton, Oklahoma City, Okla.

Application May 26, 1941, Serial No. 395,170

2 Claims. (Cl. 188—152)

The present invention relates to an improved fluid pressure braking system, or the like, for building up high pressure transmitted power, and particularly relates to a simplified and inexpensive fluid pressure braking device for use in the fluid braking system of automotive vehicles.

In automotive braking systems now in use, the relatively small size master cylinder does not have sufficient capacity to fill the wheel cylinders, nor sufficient reserve to give the final squeeze to the braking shoes, so that it has been found necessary to use a relatively large master cylinder and to incorporate an additional power means, such as a vacuum booster or a compressed air chamber, to get the necessary pressure on the hydraulic lines. This requires a relatively complicated and expensive installation.

In the compound master cylinder of the present invention, a pair of co-operating larger and smaller cylinders and pistons are provided which are both used to fill the hydraulic lines, and at a predetermined pressure the larger piston is automatically cut out and the smaller piston continues to act to exert the final high pressure on the brake shoes. This is accomplished without the use of additional booster equipment and with no special effort on the part of the operator.

The present invention is particularly concerned with improvements over the type of structure disclosed in the Sinclair et al. Patent No. 1,958,722, of May 15, 1934.

One of the primary objects of the present invention is to provide improvements in the devices of the type mentioned in which the distribution of the fluid under pressure to the brakes is so controlled that there is unrestricted flow of fluid to the rear wheels and the flow to the front wheels may be adjustably retarded.

Another object of the invention is to provide a quick release of the pressure on the hydraulic system whenever the operating power is removed, for all operating conditions.

Another object of the invention is to provide means which compensate for expansion and contraction of the fluid in the system due to temperature changes, thereby preventing the wheels from locking and also for relieving the fluid system from air bubbles, which are detrimental to the operation of the brakes.

A further object of the invention is to provide improvements in compound cylinders of the type mentioned, in which a passage and check valve are provided between the low and high pressure cylinders, and in which a low pressure release is also provided so that the passage compensates for the larger capacity of the low pressure cylinder in filling the hydraulic lines and the low pressure release relieves the system of the low pressure piston when the compound low pressure release comes into operation.

A further object of the invention is to provide a high pressure release in order to relieve the system of any excess pressure beyond a predetermined maximum, which might cause damage at some point within the hydraulic system.

A further object of the invention is to provide a compound low pressure release including a ball and piston which is of such a construction that the release first opens at any predetermined pressure to initially lift the ball from its seat and, when the ball is lifted from its seat, such pressure is exerted onto the piston which is of considerably larger area, so that a nominal pressure only would be required to hold the release open. This condition exists until the pressure within the braking system is released by the operator, when the ball again re-seats. While a ball is here illustrated and is preferable, other equivalent means, such as a disc or plunger may be used in place of the ball.

A further object of the invention is to provide an improved construction in which the initial braking effort is applied to the rear wheels but in which the full force of the braking effort is then applied through both front and rear wheels, so as to prevent the well known "jackknifing" action which is found to occur particularly with tractor-trailer assemblies.

A further object of the invention is to provide a construction which may be used as a new installation, or which may be applied to existing hydraulic braking systems in a simple manner, by which the flow of fluid under pressure to the front wheels may be retarded, as compared to the delivery to the rear wheels, while the return of fluid, upon release, is such as to give a quick release on all wheels.

Other objects of the invention will become apparent from the following specification, the drawing relating thereto, and from the claims hereinafter set forth.

In the drawing, in which like numerals are used to designate like parts in the several views throughout:

Figure 1 is a top plan view of a vehicle chassis having an improved vehicle braking system of the present invention associated therewith;

Fig. 2 is a vertical section of a master cylinder included in said braking system;

Fig. 3 is an enlarged, vertical section of a portion of the construction shown in Fig. 2; and Fig. 4 is a vertical, cross-sectional view, with parts in elevation, of a modified form of a retarding control adapter according to the present invention.

Referring to the drawing, and referring particularly to Figures 1 to 3 thereof, a conventional vehicle chassis is generally indicated at 10, having a fluid or hydraulic braking system according to the present invention associated therewith. Such braking system in general includes a master cylinder, generally indicated at 12, which is operable by a brake pedal 14 through a rod 16. The braking system includes the usual front wheel brakes 18 and rear wheel brakes 20, which are operably connected to the master cylinder 12 through conduits 22 and 24, respectively. Each of such conduits 22 and 24, of course, has branch lines leading to the right and left wheels.

The master cylinder 12 is formed of a casting including a pair of aligned bores 26 and 28, the bore 26 being of a larger diameter than the bore 28. A larger piston 30 is slidably disposed within the bore 26, and a smaller piston 32 is slidably disposed within the bore 28. The bore 28 is axially aligned with the bore 26 and is disposed adjacent the outlet, or discharge, end of the master cylinder, with the bore 26 disposed at the opposite end thereof.

The cylinder also includes a fluid reservoir 34, having a cover 36 attached thereto which is provided with a removable filler plug 38. Such filler plug 38 is provided with the usual vent opening.

A passageway 40 communicates with the bore 26 and also communicates with the bore 28 through an opening 42. A ball check valve 44 is disposed within the passageway and is normally urged to its seat by a relatively light spring 46, and functions in a manner that will be described hereinafter.

A relatively small vent opening 48 communicates the bore 26 with the reservoir 34, and another relatively small vent opening 50 communicates the bore 28 with the passageway 40 and, therefore, with the reservoir 34, through the bore 26. Such vents are for the purpose of compensating for expansion and contraction of fluid in the system due to temperature changes and also for relieving the fluid system of air bubbles.

The thrust rod 16 is received within a recess 52 formed in the rear end of the piston 30, so that upon actuation of the rod 16 the pistons 30 and 32 are moved to the right, viewing Figure 2, in the power or compression stroke of the system. Coil springs 54 and 56 are disposed within the bores 26 and 28, respectively, and co-operate with the pistons for retracting such pistons and returning them to their normal initial positions when the brakes are released. In the operation of the structure so far described, the thrust rod 16 is actuated, as above mentioned, so that this force is transmitted through the low pressure piston 30, which is directly transmitted to the high pressure piston 32, so that both pistons are moved together and thus commence the compression stroke at the same time.

A resilient sealing cup 58 is seated on the head of the piston 30; and another resilient sealing cup 60 is seated on the head of piston 32, thus preventing seepage of fluid from the cylinders 26 and 28, respectively. It will thus be seen that any force transmitted through these sealing cups will compress the fluid and cause it to flow through the bores and the by-passage 40 and out through the valve into the conduits 20 and 24, to operate the brakes.

The vent openings 48 and 50 are open when the brakes and pistons are in their retracted, or off, positions, and after the initial movement of the pistons when the brake is moved to a brake applying position, these vents become closed and the full pressure exerted by the cups 58 and 60 will be transmitted to the hydraulic lines 22 and 24.

A communicating port 62 is located to communicate the reservoir 34 with the bore 26 directly behind the head of the piston 30, when such piston is in its retracted position. This port keeps the back portion of the low pressure cylinder supplied and full of liquid at all times. An annular backing ring 64 is fixed to the rear end of the piston 30, so as to prevent the leakage of fluid and air within this portion of the bore 26.

The displacement of the bore 26 is considerably larger than the displacement in the bore 28, so that the pressure is utilized in the chambers through the passageway 40 and the action of check 44. Upon the back stroke, fluid from chamber 26 enters chamber 28 through passageway 40, past check 44 and through port 42. The fluid within the chamber 28 is also compressed so that the fluid from both chambers passes through a discharge opening 66 formed in a retarding end plug generally indicated at 68. In passing into and through such opening, the fluid passes through a cup-shaped check 70, which is mounted in the end of the spring 56 and is provided with openings 72 therearound.

As stated above, the ball check 44 is held in place by the relatively light spring 46, which returns the ball to its seat on the released stroke of the power actuator and upon the existence of certain pressure conditions in the low pressure bore.

In the application of the brakes, if there has been sufficient pressure exerted on the hydraulic lines in the above described operation to check or stop the vehicle, then all the operator has to do is to release the pressure from the foot pedal and the brakes are immediately released. If, however, more pressure on the hydraulic lines is required to stop or control the vehicle, the following means are provided so that a small additional pressure on the foot pedal will bring about an operation to be described hereinafter.

A compound low pressure release is provided which is generally indicated at 74 and which includes a housing 76 having a bore 78 therein, which are disposed within the reservoir 34. The bore, or chamber, 78 is communicable with the bore 26 through an opening or pot 80. A ball check 82 is adapted to seat over such opening 80, and is normally urged toward its seat by means of a piston 84 which slidably engages the walls of the bore 82 and is urged downwardly by means of a spiral spring 86. Such spring bears against the top surface of the plunger 84, and the top thereof abuts against and is engaged by an adjustable cap 88 which is adjustably threaded within a tapped top portion of the housing 76. By adjusting the tension of the spring 86, the pressure at which the ball 82 will be opened may be adjustably varied so that such ball may open the port 80 at any desired pressure.

The area of the plunger 84 is substantially greater than the projected area of the ball 82 so that when the ball 82 is lifted from its seat by any given predetermined pressure, such pressure immediately acts upon the larger area of the piston 84 and moves and positions such piston upwardly. A port 90 is provided through the wall of the housing 76 in a position above the opening 80, and communicates the interior of the housing 76 with the reservoir 34. Such opening 90 is normally closed by the plunger 84; but when the pressure within the bore 26 is such as to unseat the ball 82 and raise the plunger 84, the port 90 is uncovered so that the pressure within bore 26 is relieved and the fluid from the bore 26 is displaced into the reservoir 34.

When the spring 86 has been adjusted so that the ball 82 unseats at the desired pressure in order to relieve the pressure within the bore 26, this relief in pressure in the bore 26, and consequently, in the passageway 40, causes the ball check 44 to seat and thenceforth all of the pressure exerted on the hydraulic lines is put on by the smaller piston 32, or by the smaller piston cup 60. Any amount of desired pressure so developed can thus be put onto the hydraulic brake lines, depending upon the size of the smaller bore 28 and smaller piston 32 and the amount of power exerted by the operator.

For example, if the spring 86 is so adjusted that the pressure within the bore 26 is relieved when it reaches two hundred and fifty (250) pounds per square inch, any pressure, such as fifteen hundred (1,500) or two thousand (2,000) pounds per square inch, may be put onto the hydraulic lines through the action of the smaller piston.

To overcome the hazard of developing too much pressure in the hydraulic lines, there is provided a high pressure release consisting of a ball check 92, a spring 94, and an adjustable cap 96, which are disposed within a housing 98. The interior of the housing 98 communicates with the reservoir 34 through a port 99, which is located above the ball check 92. The chamber also communicates with the passageway 40 behind the ball check 44 through a port or passageway 101.

Under normal operations, this high pressure release will never be used, but it may be set so that if dangerous pressures are created within the system and within the bore 28, such high pressure will be relieved through ports 42 and 101, which will unseat the ball check 92 so that the fluid is displaced into the reservoir 34 through the port 99.

As mentioned above, one of the dangers and disadvantages of present systems is the so-called "jackknifing" effect which is produced due to the fact that the front wheel brakes may take hold before the brakes on the rear wheels. In order to overcome this difficulty and to provide proper and safe operation of the brakes, the present invention contemplates a construction which includes the retarding end plug generally indicated at 68. Such retarding end plug may be threaded into the discharge end of the compound cylinder 12 in the position shown in Fig. 2 or built into the cylinder itself as a self-contained unit. Thus, the outlet 66 is formed in the end plug and is in communication with the bore 28, as described above.

Such end plug has an outlet passageway 102 and another outlet passageway 104 formed therein. Such outlet passageway 102 is adapted to be connected through a suitable fitting 106 with the conduit 24 leading to the rear wheel brakes 20; and the passageway 104 is adapted to be connected through a suitable fitting 108 with the conduit 22 leading to the front wheel brakes.

A transverse passageway 110 is formed in the member 68 and communicates the outlet passageway 66 with the passageways 102 and 104. A restriction 112 is formed in the passageway 110 between the outlet 66 and the passageway 104 so that the flow of fluid under pressure from the passageway 66 to the front wheel brakes is retarded in the restricted passageway 112.

A ball check 114 is disposed in the passageway 110 adjacent the restriction 112, and is urged toward the restriction by means of a relatively light spiral spring 116. In order to adjustably position the ball check 114 with respect to the restriction 112 so that the flow of fluid under pressure may be controllably adjusted to the front wheels, a thumbscrew member 118 is threadably received within the end member 68 in axial alignment with the passageway 110 and the restriction 112. Such member 118 has an integral pin projection 120 formed on the inner end thereof which extends through the restriction 112 into such a position that it may engage the ball check 114. It will thus be seen that by adjusting the screw 118, the ball check 114 may be adjusted with respect to the position that it can assume with respect to the restriction 112. By so adjusting the ball chack 114, the flow of fluid to the front wheels may be adjustably controlled.

This construction also provides a quick release in that upon the return of fluid through restriction 112, the ball check 114 may be easily forced away from the restriction against the action of the light spring 116 so that the fluid may quickly return upon the release of the brakes. Set screw 118 may be set in position by means of a lock-nut 122 if desired.

The end plug 68 is so designed that it may be used on new installations or is adapted for attachment to the present-day makes or styles of master cylinders so that it may be applied to master cylinders already in use with a minimum of change required therein.

A conventional stop-light switch 123 is mounted on the cylinder 12 and communicates through a suitable port 125 with the bore 28 for the purpose of operating the stop-light upon application of the brakes, in the usual way.

Referring to Figure 4, a modified form of the retarding end plug of the present invention is illustrated which may be readily attached to the present day hydraulic braking systems now in use. Such element is so constructed that it may be readily inserted into the hydraulic line between the master cylinder and the front wheel brakes. The element includes a housing 124 having a bore 126 formed therein which communicates through a restriction 128 with outlet openings 130 and 132. An inlet fitting 134 may be threaded into one end of the element 124 and may be connected to the hydraulic line leading to the front wheels, corresponding to the conduit 22 above described, so that the fluid from the master cylinder may flow unrestrictedly into the chamber 126. A ball check 136 and a light spring 138, corresponding to the ball check 114 and spring 116 above described, are disposed within the chamber 126 so that the ball check 136 restricts the flow of fluid flowing through the restriction 128 but still permits quick return of fluid through such restriction. A screw 118, having an integral pin 120 thereon, is threaded into housing 124 in a corresponding position to that shown in Figure 3, so that the ball check 136 may be adjustably positioned with respect to the restriction 128 so as to provide the adjustable flow restriction to the front wheels.

Fittings 140 and 142 are threaded into the passageways 130 and 132, respectively, for attachment to the conduits leading to the right and left front wheels.

What is claimed is:

1. In a braking system for braking the front and rear wheels of a vehicle, a compound master cylinder having a pair of bores therein of different diameters, means forming an outlet communicable with said bores, a larger piston in the larger bore of said cylinder, a smaller piston in the other bore, means communicating said outlet with said front and rear wheel brakes, said last named means including means restricting the flow of fluid under pressure to said front wheel brakes, said last named means being constructed to enable the quick release of the fluid pressure on all of said brakes.

2. In a braking system for braking the front and rear wheels of a vehicle, a compound master cylinder having a pair of bores therein of different diameters, means forming an outlet communicable with said bores, a larger piston in the larger bore of said cylinder, a smaller piston in the other bore, means communicating said outlet with said front and rear wheel brakes, said last named means including adjustable means for adjustably restricting the flow of fluid under pressure to said front wheel brakes, said last named means being constructed to enable the quick release of the fluid pressure on all of said brakes.

LLOYD L. HAMILTON.